(12) United States Patent
Wang

(10) Patent No.: US 7,832,308 B2
(45) Date of Patent: Nov. 16, 2010

(54) TIRE-PATCHING TOOL AND ITS PATCHING METHOD

(75) Inventor: Nan-Shin Wang, Taichung County (TW)

(73) Assignee: Master Air Tool Corp., Taichung County (TW)

( * ) Notice: Subject to any disclaimer, the term of this patent is extended or adjusted under 35 U.S.C. 154(b) by 0 days.

(21) Appl. No.: 12/104,676

(22) Filed: Apr. 17, 2008

(65) Prior Publication Data
US 2009/0260487 A1    Oct. 22, 2009

(51) Int. Cl.
*B29C 73/08* (2006.01)
(52) U.S. Cl. ........................................ 81/15.7
(58) Field of Classification Search ................. 81/15.7, 81/15.2; 152/370; 173/218
See application file for complete search history.

(56) References Cited

U.S. PATENT DOCUMENTS 3,388,451 A * 6/1968 Holder ..................... 29/235
3,542,614 A * 11/1970 Hopkins ....................... 156/97
4,479,408 A * 10/1984 Niconchuk ................. 81/15.7
6,401,572 B1 * 6/2002 Provost ..................... 81/57.14
7,051,622 B1 * 5/2006 Chen ......................... 81/15.7
7,377,197 B1 * 5/2008 Lin ............................ 81/15.7
2008/0265453 A1 * 10/2008 Brazeau ................... 264/36.14

* cited by examiner

*Primary Examiner*—David B Thomas
(74) *Attorney, Agent, or Firm*—Pai Patent & Trademark Law Firm; Chao-Chang David Pai

(57) ABSTRACT

A tire-patching tool and its patching method includes a pneumatic tool for producing a rotation force with a preset rotating speed, and a tire-patching needle with a tire seal strip assembled on the pneumatic tool to be driven into a broken hole of a tire. In using, the pneumatic tool is started to transmit a rotation force to the tire-patching needle so that the tire-patching needle can be vertically driven into the tire in the direction of the broken hole to let the tire seal strip stuck in the broken hole of the tire, and then remove out the tire-patching needle to finish tire patching work. By the pneumatic tool driving the tire-patching needle to produce a rotation force, the tire seal strip can quickly and accurately be stuck in the broken hole of the tire, saving time and labor in carrying out tire patching work.

10 Claims, 4 Drawing Sheets

TIRE-PATCHING TOOL AND ITS PATCHING METHOD

BACKGROUND OF THE INVENTION

1. Field of the Invention

This invention relates to a tire-patching tool and its patching method, particularly to one able to carry out tire patching work quickly and with less labor.

2. Description of the Prior Art

A first kind of conventional tire-patching tool, as shown in FIG. 1, includes a rotary handle 1 assembled thereon with a rod 2 with a proper length. The rod 2 has its front end combined with a pointed flat needle 3 bored in the center with a lengthwise needle hole 4 having its front pointed end cut with a slotted opening 5. To carry out tire patching work, a tire seal strip (not shown) is first inserted into the needle hole 4 through the slotted opening 5. Then, the rotary handle 1 is held and turned around to drive the flat needle 3 into the broken hole of a tire to finish patching the tire. However, it will take a lot of exertion and time to manually drive the flat needle 3 into a tire, especially a thick tire, and in this case, a hammer has to be used for helping drive the flat needle 3 into the tire. In addition, the broken hole caused by a nail is not necessarily perpendicular to the tire wall; therefore, it is impossible to accurately drive the flat needle 3 into the broken hole of the tire manually, and the broken hole is likely to become worse and the tire may be damaged if the flat needle 3 is operated imprudently.

As shown in FIG. 2, a second kind of conventional tire-patching tool, which is provided with a power source (a pump) in a pneumatic mode, includes a percussion member 6 disposed in the interior. The percussion member 6 has its front end combined with a driving rod 7 at a corresponding location of the opening of the tire-patching tool to be driven by the power source for carrying out reciprocating movement, and the driving rod 7 has its front end bored with a lengthwise needle hole 8 for combining a tire seal strip 9 therein. In using, the power source is first started to actuate the percussion member 6 to drive the driving rod 7 into the broken hole of a tire by air compression, and when the driving rod 7 is no longer driven by the power source, it will automatically recover its original position, and at this time the tire seal strip 9 will be stuck in the broken hole of the tire. However, the driving rod 7 is directly driven into the tire without considering the vertical surface of the tire and the direction of the broken hole, and it is impossible to measure or adjust the length of the driving rod 7 pierced into the tire. If the driving rod 7 is pierced into the tire too far, the tire seal strip 9 will drop in the hollow interior of the tire, failing to patch up the tire.

SUMMARY OF THE INVENTION

This invention is devised to offer a tire-patching tool and its patching method, which includes a pneumatic tool for producing a rotation force with a preset rotating speed, and a tire-patching needle with a tire seal strip assembled on the pneumatic tool to be driven into the broken hole of a tire. In using, the pneumatic tool is started to transmit a rotation force to the tire-patching needle for vertically driving the tire-patching needle into the tire through the broken hole to let the tire seal strip clogged and stuck in the broken hole of the tire, and then remove the tire-patching needle from the tire to finish tire-patching work.

The tire-patching tool and its patching method in the present invention is provided with the pneumatic tool for driving the tire-patching needle to produce a rotation force to enable the tire seal strip to be quickly clogged and stuck in the broken hole of the tire, thus economizing time and labor in doing tire-patching work.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
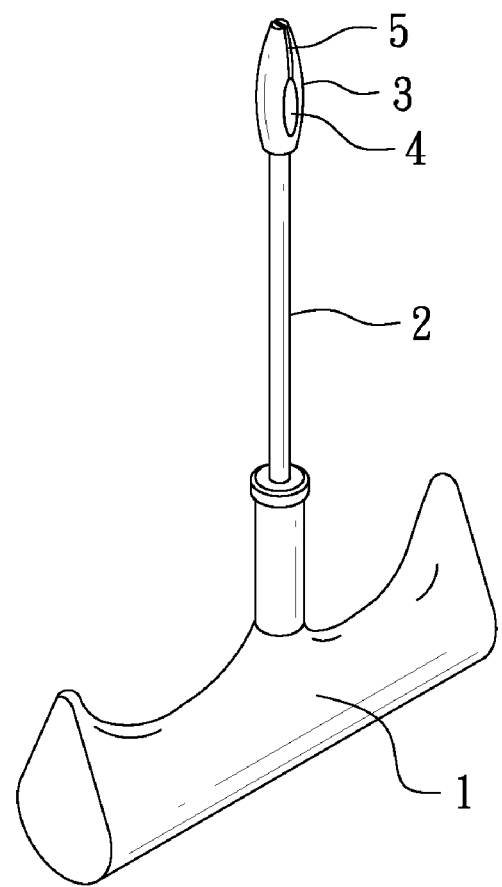
FIG. 1 is a perspective view of a first kind of conventional tire-patching tool.
Figure 2:
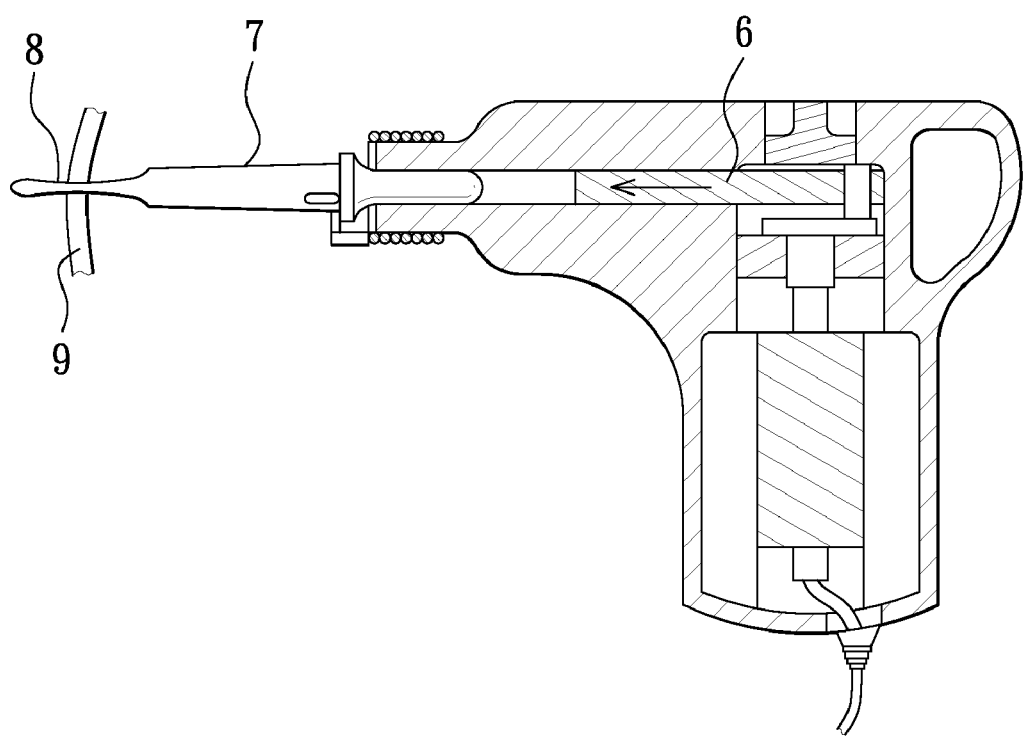
FIG. 2 is a cross-sectional view of a second kind of conventional tire-patching tool.
Figure 3:
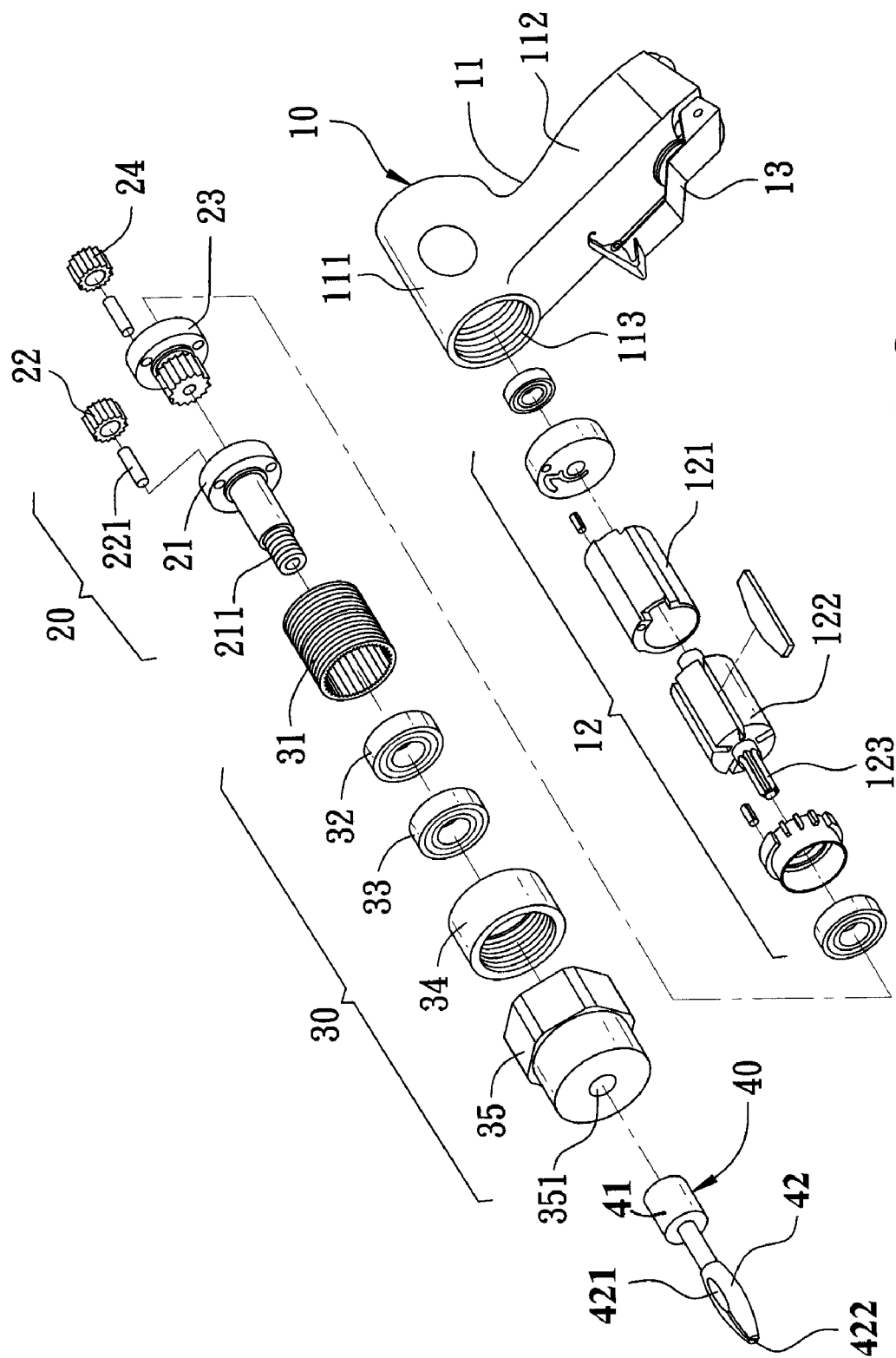
FIG. 3 is an exploded perspective view of a tire-patching tool in the present invention.

A preferred embodiment of a tire-patching tool in the present invention, as shown in FIG. 3, includes a main body 10, a reduction gear set 20, a combining unit 30 and a tire-patching needle 40 as main components combined together.

The main body 10 is a pneumatic tool including an outer casing 11 formed integrally and having its upper portion provided with a driving head 111 and its lower portion disposed with a handle 112. A cylinder component unit 12 is installed in the interior of the driving head 111 for supplying power, composed of a cylinder column 121 and a power output cylinder 122 combined with the cylinder column 121 and having its front end extended outward to form a power output shaft 123. The driving head 111 has its front side bored with an opening 113, and the handle 112 is assembled with a trigger switch 13 at the same side of the opening 113 to actuate the cylinder component unit 12 in the outer casing 11 for driving the main body 10 to operate.

The reduction gear set 20 is installed in the interior of the driving head 111 and positioned at the front end of the cylinder component unit 12, facing the opening 113 and orderly provided with a planetary gear rod 21, a first planetary gear 22, a rear geared member 23 and a second planetary gear 24. The planetary gear rod 21 shaped as a threaded rod has its front end formed with a threaded member 211, and the first planetary gear 22 is connected with the rear end of the planetary gear rod 21 by means of a shaft pin 221 and abutting on the rear geared member 23. The planetary gear rod 21 has its inner circumferential gear engaged with the rear geared member 23, which has the other end fixedly connected with the second planetary gear 24 by another shaft pin 241, with the second planetary gear 24 and the first planetary gear 22 positioned at the same side. The second planetary gear 24 has its circumferential gear teeth engaged with the power output shaft 123 of the cylinder component unit 12. By such mutual engagement, the reduction gear set 20 can be actuated to rotate.

The combining unit 30 is for combining and fixing the reduction gear set 20, facing the reduction gear set 20 and coaxially and orderly provided with an internal geared ring 31, two bearings 32, 33, a clamping ring 34 and a clamping nut 35. The internal geared ring 31 has its front inner portion fitted with the reduction gear set 20 and its internal gear engaged with the outer circumferential gear teeth of both the first and the second planetary gear 22 and 24. The two bearings 32, 33 are fixed in the internal geared ring 31 and positioned at the front end of the planetary gear rod 21. The internal geared ring 31 has its rear portion extended out of the opening 113 of the driving head 111, and the clamping ring 34 and the clamping nut 35 are orderly fitted on the rear outer circumference of the internal geared ring 31, letting the threaded member 211 at the end of the planetary gear rod 21 inserted out of the insert hole 351 of the clamping nut 35 and combined with the tire-patching needle 40.

The tire-patching needle 40 with a length shorter than the thickness of a tire wall has a rear end formed with a combination member 41 to be threadably combined with the threaded member 211 of the planetary gear rod 21, letting the rear end of the tire-patching needle 40 just located at the opening 113 of the driving head 111. Thus, the reduction gear set 20 can be driven by the cylinder component unit 12 in the driving head 11 to operate and actuate the tire-patching needle 40 to rotate. The tire-patching needle 40 has its front portion formed with a pointed flat member 42 extending outward for a proper length from the combination member 41 and bored with a lengthwise needle hole 421 having its front pointed end cut with a slotted opening 422 for receiving a tire seal strip 50 therein.

Figure 4:
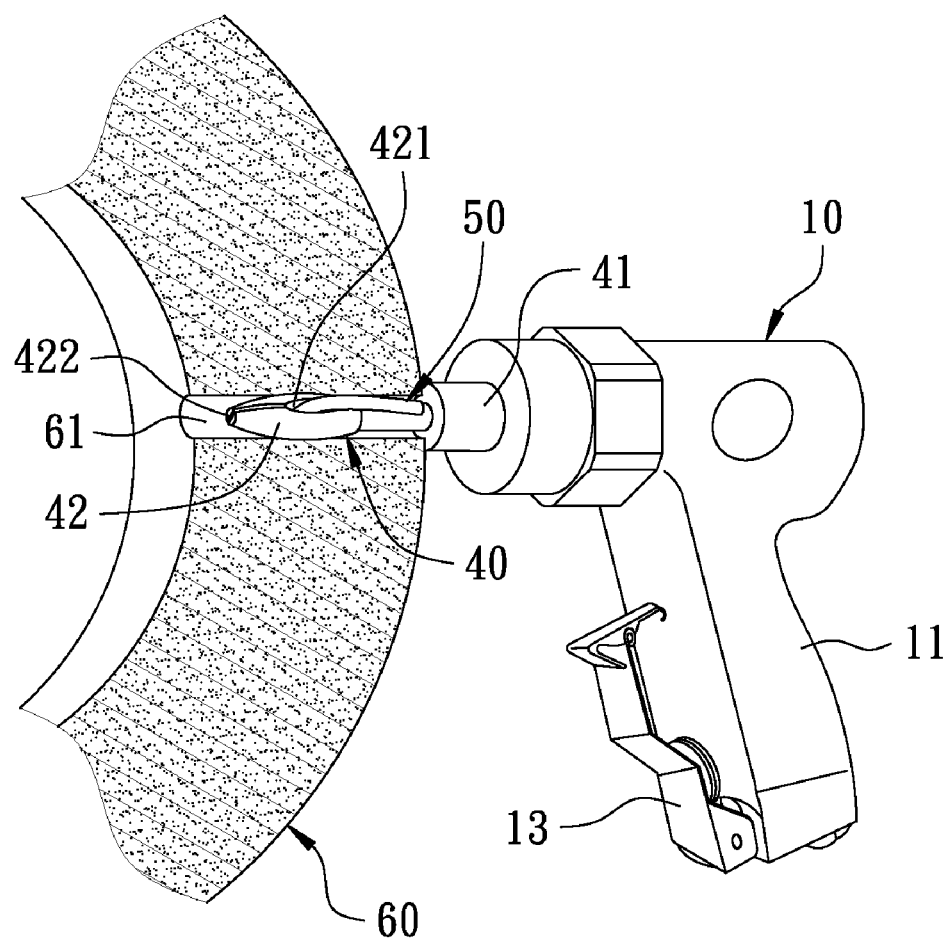
FIG. 4 is a perspective view of the tire-patching tool in a using condition in the present invention.

Referring to FIGS. 3 and 4, the tire-patching method in the present invention includes the following steps.

1. A tire seal strip 50, a tire-patching needle 40 and a pneumatic tool driven to rotate by the cylinder component unit 12 are prepared;

2. The combination member 41 of the tire-patching needle 40 is threadably connected with the threaded member 211 of the planetary gear rod 21 to enable the pneumatic tool to transmit a rotation force to the tire-patching needle 40; and 3. The tire seal strip 50 is inserted and fixed in the needle hole 421 through the slotted opening 422, and then the trigger switch 13 of the main body 10 is pressed to actuate the cylinder component unit 12 to operate. Simultaneously, the power output shaft 123 of the cylinder component unit 12 will be operated to transmit air-intake power to the reduction gear set 20, and hence the tire-patching needle 40 can be vertically driven into the tire 60 through the broken hole 61 until the combination member 41 at the end of the tire-patching needle 40 resists against the outer wall of the tire 60. Thus, it can be known that the tire-patching needle 40 is entirely driven into the broken hole 61 and the tire seal strip 50 is accurately stuck in the broken hole 61 without exceeding the range of the broken hole 61. By so designing, the reduction gear set 20 can function to regulate a comparatively great power supplied by the cylinder component unit 12 and then transmit a rotation force with a low speed and high torsion to the tire-patching needle 40 to let the tire-patching needle 40 smoothly carry the tire seal strip 50 into the broken hole 61 of the tire 60. In addition, being able to regulate the power supplied by the cylinder component unit 12, the reduction gear set 20 enables the pneumatic tool to adjust its torsion force according to different materials of tires 60 and transmit a rotating force with a low speed and high torsion to the tire-patching needle 40 so as to avoid the tire-patching needles 40 producing too great a rotating force and causing damage to the tire 60.

When the tire seal strip 50 is stuck in the broken hole 61, the trigger switch 13 is timely pulled to actuate the tire-patching needle 40 to be rotated slowly and removed from the broken hole 61 by the restoring force of the cylinder component unit 12. Thus, the tire-seal strip 50 can be quickly stuck in the broken hole 61 of the tire 60 to finish patching the tire.

As can be understood from the above description, this invention has the following advantages.

1. The slotted opening and the needle hole of the tire-patching needle facilitate inserting and combining the tire seal strip. The tire-patching needle is assembled on the pneumatic tool that is provided with the cylinder component unit for supplying power to drive the tire-patching needle to rotate and vertically pierce into the tire through the broken hole, thus enabling a user to do tire patching work with quickness and with less force. Additionally, the reduction gear set is able to regulate the great power supplied by the cylinder component unit and transmit a proper rotating force to the tire-patching needle for avoiding the tire-patching needle producing too great a rotating force and causing damage to the tire; and 2. The combination member at the end of the tire-patching needle can function to resist against the outer wall of the tire; therefore, the tire seal strip can be accurately stuck in broken hole, facilitating checking the length of the tire-patching needle pierced into the tire, preventing the tire seal strip from dropping in the hollow interior of the tire and quickly finishing tire patching work.

While the preferred embodiment of the invention has been described above, it will be recognized and understood that various modifications may be made therein and the appended claims are intended to cover all such modifications that may fall within the spirit and scope of the invention.

I claim:

1. A tire-patching method comprising following steps:
   step one: preparing a tire seal strip, a pneumatic tool with a cylinder component unit for transmitting a torque for rotation, and a tire-patching needle which has an enlarged combination end to be firmly connected with the cylinder component unit of said pneumatic tool;
   step two: connecting said enlarged combination end of said tire-patching needle with the cylinder component unit of said pneumatic tool, then fixing said tire seal strip in a needle hole of said tire-patching needle;
   step three: starting said pneumatic tool and having said tire-patching needle aligned to a broken hole of a tire and allowing said cylinder component unit to transmit a torque for rotation to said tire-patching needle to drive the tire-patching needle into the broken hole in a preset orientation until the enlarged combination end of the tire-patching needle is stopped at an outer wall of the tire; and
   step four: removing said tire-patching needle out of said broken hole to let said tire seal strip stuck in said broken hole to finish tire patching work.

2. The tire-patching method as claimed in claim 1, wherein said tire-patching needle is threadably combined with a threaded member of a planetary gear rod received in said pneumatic tool so that said pneumatic tool is able to transmit a torque for rotation to said tire-patching needle.

3. The tire-patching method as claimed in claim 1, wherein said cylinder component unit transmits a torque for rotation to said tire-patching needle through a reduction gear set positioned in said pneumatic tool.

4. The tire-patching method as claimed in claim 1, wherein the length of the tire-patching needle other than the enlarged combination end is shorter than the thickness of the tire to be patched.

5. A tire-patching tool comprising:
   a main body provided with an outer casing formed integrally, said outer casing comprising a driving head at its upper side and a handle at its lower side, said driving head having installed therein a cylinder component unit for supplying a power source, said driving head having one side bored with an opening, wherein said cylinder component unit comprises a cylinder column and a power output cylinder combined together, said power output cylinder having a power output shaft extending forward; and a tire-patching needle, said tire-patching needle having one end provided with an enlarged combination end to be connected with the cylinder component unit at said opening of said driving head, said tire-patching needle having its front portion formed as a pointed flat member with a preset length, said pointed flat member having a lengthwise needle hole in the center, said needle hole having a slotted opening at its front pointed end for inserting a tire seal strip in said needle hole.

6. The tire-patching tool as claimed in claim 5, wherein said handle is installed with a trigger switch at a same side of said opening of said driving head for driving said main body to operate.

7. A tire-patching tool comprising:
- a main body provided with an outer casing formed integrally, said outer casing comprising a driving head at its upper side and a handle at its lower side, said driving head having installed therein a cylinder component unit for supplying a power source, said driving head having one side bored with an opening; and
- a tire-patching needle, said tire-patching needle having one end provided with an enlarged combination end to be connected with the cylinder component unit at said opening of said driving head, said tire-patching needle having its front portion formed as a pointed flat member with a preset length, said pointed flat member having a lengthwise needle hole in the center, said needle hole having a slotted opening at its front pointed end for inserting a tire seal strip in said needle hole, wherein the enlarged combination end of said tire-patching needle is connected to said cylinder component unit by means of a reduction gear set and a combining unit.

8. The tire-patching tool as claimed in claim 7, wherein said reduction gear set is assembled in said driving head and positioned at a front end of said cylinder component unit, said reduction gear set facing said opening of said driving head and orderly disposed with a planetary gear rod, a first planetary gear, a rear geared member and a second planetary gear.

9. The tire-patching tool as claimed in claim 8, wherein said planetary gear rod has one end provided with a threaded member, and the enlarged combination end of said tire-patching needle is threadably connected with said threaded member of said planetary gear rod.

10. The tire-patching tool as claimed in claim 7, wherein said combining unit is employed for combining and fixing said reduction gear set, said combining unit facing said reduction gear set and coaxially and orderly provided with an internal geared ring, two bearings, a clamping ring and a clamping nut.

* * * * *